United States Patent [19]

Burns et al.

[11] Patent Number: 5,708,069

[45] Date of Patent: Jan. 13, 1998

[54] METHOD FOR MAKING HYDROPHOBIC SILICA GELS UNDER NEUTRAL CONDITIONS

[75] Inventors: Gary Thomas Burns; Qin Deng; James Richard Hahn; Clifford Carlton Reese, all of Midland, Mich.

[73] Assignee: Dow Corning Corporation, Midland, Mich.

[21] Appl. No.: 805,398

[22] Filed: Feb. 24, 1997

[51] Int. Cl.$^6$ .................................................. C08K 3/10
[52] U.S. Cl. .......................... 524/403; 427/219; 427/220; 428/391; 428/405; 524/435; 528/10; 528/12; 528/14; 528/15; 528/21; 528/23; 528/30
[58] Field of Search ...................... 528/10, 12, 14, 528/15, 21, 23, 30; 524/403, 435; 427/219, 220; 428/391, 405

[56] References Cited

U.S. PATENT DOCUMENTS

| | | |
|---|---|---|
| 2,892,797 | 2/1959 | Alexander et al. . |
| 3,015,645 | 1/1962 | Tyler . |
| 3,024,126 | 3/1962 | Brown . |
| 3,122,520 | 2/1964 | Lentz . |
| 3,850,971 | 11/1974 | Termin et al. . |
| 3,979,546 | 9/1976 | Lewis . |
| 4,006,175 | 2/1977 | Termin et al. . |
| 4,360,388 | 11/1982 | Nauroth et al. . |
| 5,565,142 | 10/1996 | Deshpande et al. . |

FOREIGN PATENT DOCUMENTS

| | | |
|---|---|---|
| 0 658 513 A1 | 6/1995 | Germany . |
| 0 690 023 A2 | 6/1995 | Germany . |

*Primary Examiner*—Melvyn I. Marquis
*Attorney, Agent, or Firm*—William F. Boley

[57] ABSTRACT

The present invention is hydrophobic silica gels and a method for their preparation under neutral conditions. The method comprises two steps, where in the first step the pH of a silica hydrosol is adjusted with a base to within a range of about pH 3 to pH 7 to facilitate formation of a silica hydrogel. In the second step the silica hydrogel is contacted with an organosilicon compound in the presence of a catalytic amount of a strong acid to effect hydrophobing of the silica hydrogel. In a preferred method, in a third step the hydrophobic silica gel is contacted with a sufficient quantity of a water-immiscible organic solvent to convert the hydrophobic silica hydrogel into a hydrophobic silica organogel.

23 Claims, No Drawings

METHOD FOR MAKING HYDROPHOBIC SILICA GELS UNDER NEUTRAL CONDITIONS

BACKGROUND OF INVENTION

The present invention is hydrophobic silica gels and a method for their preparation under neutral conditions. The method comprises two steps, where in the first step the pH of a silica hydrosol is adjusted with a base to within a range of about pH 3 to pH 7 to facilitate formation of a silica hydrogel. In the second step the silica hydrogel is contacted with an organosilicon compound in the presence of a catalytic amount of a strong acid to effect hydrophobing of the silica hydrogel to form a hydrophobic silica hydrogel having a surface area within a range of about 100 $m^2/g$ to 850 $m^2/g$ as measured in the dry state. In a preferred method the hydrophobic silica gel is contacted with a sufficient quantity of a water-immiscible organic solvent to convert the hydrophobic silica hydrogel into a hydrophobic silica organogel. The organic solvent can then be removed from the hydrophobic silica organogel to form a dry hydrophobic silica gel having a surface area within a range of about 100 $m^2/g$ to 850 $m^2/g$. Prior to conduct of the second step, the silica hydrogel may be aged at a pH within a range of about pH 3.5 to pH 8. In addition, a water soluble compound of cerium or iron may be added during conduct of the first or second step to improve the heat stability of the hydrophobic silica gel.

Although hydrophobic silica gels prepared by the present method are useful in many applications such as thermal insulation, reinforcing and extending filler in natural rubbers, and as filler in floatation devices, they are particularly useful as reinforcing fillers in silicone rubber compositions. It is well known that silicone rubbers formed from the vulcanization of polydiorganosiloxane fluids or gums alone generally have low elongation and tensile strength values. One means for improving the physical properties of such silicone rubbers involves the incorporation of a reinforcing silica filler into the fluid or gum prior to curing. However, silica reinforcing fillers have a tendency to interact with the polydiorganosiloxane fluid or gum causing a phenomenon typically referred to as "crepe hardening." A great deal of effort has been made in the past to treat the surface of reinforcing silica fillers with organosilanes or organosiloxanes to make the surface of the silica hydrophobic. This surface treatment reduces or diminishes the tendency of the compositions to crepe harden and improves the physical properties of the cured silicone rubber.

Brown, U.S. Pat. No. 3,024,126, teaches a method for making a pre-formed reinforcing silica filler hydrophobic by treating it in an organic solvent with an organosilicon compound, such as an organosilane or low-molecular weight organosiloxane containing 0.1 to 2 total hydroxyl and/or alkoxy radicals per silicon atom, and a small amount of amine, quaternary ammonium, or organometallic compound.

Lewis, U.S. Pat. No. 3,979,546, teaches a method for making the surface of reinforcing silica fillers hydrophobic through the use of alpha-alkoxy-omega-siloxanols with alcohols under mild conditions. The fillers taught are pre-formed solids.

Tyler, U.S. Pat. No. 3,015,645, teaches the making of hydrophobic silica powders by reacting an organosilicon compound such as dimethyldichlorosilane or trimethylmethoxysilane with an silica organogel in the presence of an acidic catalyst and then removing the volatile materials. The method requires the preparation of a silica hydrogel which is converted to a silica organogel by replacing the water in the silica hydrogel with an organic solvent.

Lentz, U.S. Pat. No. 3,122,520, teaches a procedure where an acidic silica hydrosol is first heated to develop a reinforcing silica structure and then mixed with an organosilicon compound, an acid catalyst, and a water-immiscible organic solvent to produce a hydrophobic silica filler. The organosilicon compounds taught by Lentz are limited to those compounds in which the organic radicals bonded to silicon atoms have less than 6 carbon atoms, organosilicon compounds having no organofunctional substituents bonded to silicon atoms, and to organosilicon compounds having no hydrogen bonded to silicon atoms.

Alexander et al., U.S. Pat. No. 2,892,797, describe silica sols modified by treatment with a solution of a metalate so that the silica particles are coated with no more than a molecular layer of a combined metal which forms an insoluble silicate between pH 5 and pH 12. Aluminum, tin, zinc, and lead are taught as the preferred metals. Alexander et al. teach that silica sols which carry a metal upon the surface of the particles according to their invention have increased stability at pH extremes.

Termin et al., U.S. Pat. No. 3,850,971, and Termin et al. U.S. Pat. No. 4,006,175 teach that porous silicic acid having a specific surface area of about 50 $m^2/g$ to 1000 $m^2/g$ can be made by hydrolyzing methyl or ethyl silicate or polymethyl or polyethyl silicate with about 70 to 120% of the stoichiometric amount of water with moderate stirring. Termin et al. teach that transition metals such as iron oxides and chromium oxides may be used as hydrolysis activators and that such metals may appear in the end product.

Nauroth et al., U.S. Pat. No. 4,360,388, teach cerium containing precipitated silica. Nauroth et al. teach that silicone rubber compositions reinforced with the cerium containing precipitated silica exhibit excellent heat stability and that the cerium containing precipitated silica acts as a fire retardant agent.

Jensen et al., EP 0-690-023 A2, teach the formation of silica gels by adding base to an aqueous waterglass solution, aging the silica hydrogels at pH 4 to pH 11, and converting the silica hydrogels to a silica organogel prior to a hydrophobing step.

Jensen et al., EP 0-658,531 A1, teach the formation of silica gels by adding base to an aqueous waterglass solution, aging the silica gels at pH 6 to pH 11, and converting the silica hydrogel to a silica organogel prior to a hydrophobing step.

Deshpande et al., U.S. Pat. No. 5,565,142, teach inorganic metal oxide gels treated with an organic agent to modify the contact angle of the fluid meniscus in the pores during drying to minimize shrinkage of the gel. The gels can be treated under near neutral conditions and heat aged. Deshpande et al. teach that all water must be removed from the gels prior to treatment with the organic agent.

The present method does not require that the silica hydrogel be converted to a silica organogel prior to the hydrophobing step. However in the present method, if desired, the second and third steps may be conducted simultaneously providing for an expedited process. In addition, the neutral conditions for preparing the silica hydrogels provide advantages over a process where the silica hydrogel is prepared under strong acid conditions. The advantages include reduced use of acid in the process, the ability to use less acid resistant process equipment, and faster conversion of the silica hydrosol into the corresponding silica hydrogel.

SUMMARY OF INVENTION

The present invention is hydrophobic silica gels and a method for their preparation under neutral conditions. The method comprises two steps, where in the first step the pH of a silica hydrosol is adjusted with a base to within a range of about pH 3 to pE 7 to facilitate formation of a silica hydrogel. In the second step the silica hydrogel is contacted with an organosilicon compound in the presence of a catalytic amount of a strong acid to effect hydrophobing of the silica hydrogel thereby forming a hydrophobic silica hydrogel having a surface area within a range of about 100 $m^2/g$ to 850 $m^2/g$. In a preferred method, in a third step the hydrophobic silica gel is contacted with a sufficient quantity of a water-immiscible organic solvent to convert the hydrophobic silica hydrogel into a hydrophobic silica organogel. The organic solvent can be removed from the hydrophobic silica organogel to form a dry hydrophobic silica gel having a surface area within a range of about 100 $m^2/g$ to 850 $m^2/g$. Prior to conduct of the second step the silica hydrogel may be aged at a pH within a range of about pH 3.5 to pH 8. In addition a water soluble compound of cerium or iron may be added during conduct of the first or second step to improve the heat stability of the hydrophobic silica gel.

DESCRIPTION OF INVENTION

The present invention is hydrophobic silica gels and a method for their preparation under neutral conditions. The method for preparing the hydrophobic silica gels comprises: (A) adjusting the pH of a silica hydrosol comprising about 0.02 to 0.5 g of $SiO_2$ per milliliter with a base to within a range of about pH 3 to pH 7 at a temperature within a range of about 10° C. to 250° C. to facilitate formation of a silica hydrogel and (B) mixing the silica hydrogel with (1) a catalytic amount of a strong acid and (2) an organosilicon compound selected from the group consisting of organosilanes described by formula

$$R^2{}_a H_b SiX_{4-a-b} \qquad (1)$$

and organosiloxanes described by formula

$$R^2{}_n SiO_{(4-n)/2}, \qquad (2)$$

where each $R^2$ is independently selected from a group consisting of hydrocarbon radicals comprising about 1 to 12 carbon atoms and organofunctional hydrocarbon radicals comprising about 1 to 12 carbon atoms, each X is independently selected from a group consisting of halogen and alkoxy radicals comprising about 1 to 12 carbon atoms, a=0, 1, 2, or 3, b=0 or 1, a+b=1, 2, or 3 with the proviso that when b=1 then a+b=2 or 3, and n is an integer of from 2 to 3 inclusive to form a hydrophobic silica hydrogel having a surface area within a range of about 100 $m^2/g$ to 850 $m^2/g$ as measured in the dry state. A preferred method further comprises (C) contacting the hydrophobic silica hydrogel with a sufficient quantity of a water-immiscible organic solvent to convert the hydrophobic silica hydrogel into a hydrophobic silica organogel having a surface area within a range of about 100 $m^2/g$ to 850 $m^2/g$ as measured in the dry state.

The method of the present invention is a two step procedure, comprising steps (A) and (B) for making hydrophobic silica gels under neutral conditions. Step (A) of the method comprises adjusting the pH of a silica hydrosol with a base to within a range of pH 3 to pH 7 to facilitate formation of a silica hydrogel. Step (B) comprises mixing the silica hydrogel prepared in step (A) with an organosilicon compound which reacts with the silica hydrogel to give a hydrophobic silica hydrogel. A preferred method further comprises a step (C) where the silica hydrogel is contacted with a sufficient amount of a water-immiscible organic solvent to convert the hydrophobic silica hydrogel to a hydrophobic silica organogel. If desired, steps (B) and (C) may be combined so that the hydrophobic silica hydrogel is converted to a silica organogel as it is formed. The solvent can them be removed from the hydrophobic silica organogel to form a hydrophobic silica gel. Hydrophobic silica gels prepared by the present method are useful as reinforcing fillers in, for example, silicone rubber and organic rubber compositions.

The method used to prepare the silica hydrosol is not critical and can be any of those known in the art. Silica hydrosols useful in the present method can be prepared by, for example, deionizing sodium silicate by a method such as the use of an ion exchange resin. The silica hydrosol may be prepared by hydrolyzing a silane at a low temperature. The silica hydrosol may be prepared by acidifying a sodium silicate mixture.

In step (A), the pH of the silica hydrosol is adjusted to within a range of about pH 3 to pH 7 by addition of a base to facilitate formation of a silica hydrogel. Preferably, the pH of the silica hydrosol is adjusted by means of a base to within a range of about 3.5 to 6. For the purpose of this invention any base can be used. Preferred is an inorganic base such as NaOH, KOH, and $Na_2(SiO_2)_{3.36}$. The temperature at which step (A) is conducted can be within a range of about 10° C. to 250° C. Preferred is when step (A) is conducted at a temperature within a range of about 75° C. to 150° C. Even more preferred is when step (A) is conducted at a temperature within a range of about 90° C. to 110° C.

In step (A), the time required for the silica hydrosol to convert to the corresponding silica hydrogel varies with the temperature and pH. Generally the higher the temperature and the higher the pH the shorter the time needed. Step (A) must be continued until the silica hydrogel acquires a structure such that the final product after hydrophobing has a surface area in the dry state within a range of about 100 $m^2/g$ to 850 $m^2/g$ as determined by the Brunauer Emmett and Teller (BET) method described in the Jour. Am. Chem. Soc. 60:309 (1938) and as further described in Lentz, U.S. Pat. No. 3,122,520 which is hereby incorporated by reference for such a teaching. The surface area of the silica hydrogel at the conclusion of step (A) is immaterial provided it is such that the surface area of the dried product of the present method is within the above described range. Generally the surface area of the silica hydrogel is reduced by the hydrophobing reaction, since the organosilyl groups which become attached to the surface of the silica hydrogel increase the average particle size. The surface of the silica hydrogel can be above 850 $m^2/g$ provided that the hydrophobing treatment brings it within a range of about 100 $m^2/g$ to 850 $m^2/g$. To determine the proper contact conditions during conduct of step (A) it is necessary to proceed with steps (B) and (C) and then measure the surface area of the resulting product in the dry state. If the surface area of the resulting product in the dry state is above 850 $m^2/g$, then the contacting conditions of step (A) were too mild. If the surface area of the resulting product in the dry state is below 100 $m^2/g$, then the contacting conditions of step (A) were too severe. Examples of suitable pH conditions, temperatures, and times for conduct of step (A) are provided in the Examples herein. If the surface area of the hydrophobic silica gel in the dry state is above or below the described range, the hydrophobic silica gels have diminished reinforcing properties in silicone elastomers.

In an alternative embodiment of the present method, the silica hydrogel of step (A) can be aged at a pH within a range of about pH 3.5 to pH 8 prior to conduct of step (B). Preferred is when the silica hydrogel is aged at a pH within a range of about pH 6 to pH 7.5. If necessary, the pH of the silica hydrogel can be adjusted for aging to within the described ranges by use of a base such as previously described for use in step (A). Generally, the silica hydrogel can be aged at a temperature within a range of about 0° C. to 250° C. It is preferred that the silica hydrogel be aged at a temperature within a range of about 20° C. to 150° C. Most preferred is when the silica hydrogel is aged at a temperature within a range of about 80° C. to 130° C. The length of time for aging the silica hydrogel can be from about 10 minutes to 76 hours or longer. A preferred length of time for aging the silica hydrogel is within a range of about 1 hour to 24 hours.

If desired, the silica hydrogel of step (A) may be subjected to a shearing force to reduce aggregate particle size and create a more uniform particle size distribution prior to the conduct of the hydrophobing reaction of step (B). If shearing is conducted, it is preferred that shearing of the silica hydrogel be performed after any aging of the silica hydrogel is completed. The shearing force may be applied to the silica hydrogel by any of those methods known in the art. The shearing force may be applied, for example, by a mechanical means such as a high-speed mixer or by ultrasound. This reduction in aggregate particle size and improved particle size distribution can provide for hydrophobic silica gels which when compounded into silicone elastomer compositions provide for lower viscosity compositions, more stable compositions, and for cured silicone elastomers having improved clarity and physical properties.

In step (B) of the present method the silica hydrogel of step (A) is mixed with one or more of the defined organosilicon compounds described by formulas (1) and (2) in the presence of a catalytic amount of a strong acid. The catalytic amount of strong acid can be added either prior to, simultaneously with, or subsequent to the addition of the organosilicon compound. In the case where the organosilicon compound is, for example, a chlorosilane, the catalytic amount of the strong acid can be generated in situ by hydrolysis of the chlorosilane or the reaction of the chlorosilane directly with hydroxyls of the silica hydrogel. By the term "catalytic amount" it is meant that the strong acid is present in an amount sufficient to effect reaction of the organosilicon compound with the silica hydrogel. Examples of useful acids include hydrochloric, hydroiodic, nitric, phosphoric, sulfuric, and benzene sulfonic acids. It is preferred that in step (B) the strong acid catalyst provide a pH less than about 2.5.

The temperature at which step (B) is conducted is not critical and can be from about 20° C. to 250° C. Generally, it is preferred that step (B) be conducted at a temperature within a range of about 30° C. to 150° C.

In step (B), the silica hydrogel of step (A) is reacted with an organosilicon compound described by formula (1) or (2). In formulas (1) and (2), each $R^2$ can be independently selected from a group consisting of hydrocarbon radicals comprising about 1 to 12 carbon atoms and organofunctional hydrocarbon radicals comprising about 1 to 12 carbon atoms. $R^2$ can be a saturated or unsaturated hydrocarbon radical. $R^2$ can be a substituted or non-substituted hydrocarbon radical. $R^2$ can be, for example, alkyl radicals such as methyl, ethyl, t-butyl, hexyl, heptyl, octyl, decyl, and dodecyl; alkenyl radicals such as vinyl, allyl, and hexenyl; substituted alkyl radicals such as chloromethyl, 3,3,3-trifluoropropyl, and 6-chlorohexyl; and aryl radicals such as phenyl, naphthyl, and tolyl. $R^2$ can be an organofunctional hydrocarbon radical comprising about 1 to 12 carbon atoms where, for example, the functionality is mercapto, disulfide, polysulfide, amino, carboxylic acid, carbinol, ester, or amido. A preferred organofunctional hydrocarbon radical is one having disulfide or polysulfide functionality.

In formula (1) each X is independently selected from a group consisting of halogen and alkoxy radicals comprising about 1 to 12 carbon atoms. When X is a halogen, it is preferred that the halogen be chlorine. When X is an alkoxy radical, X may be, for example, methoxy, ethoxy, and propoxy. Preferred is where each X is selected from a group consisting of chlorine atoms and methoxy.

The viscosity of the organosiloxanes described by formula (2) is not limiting and can range from that of a fluid to a gum. Generally, higher molecular weight organosiloxanes will be cleaved by the acidic conditions of the present method allowing them to react with the silica hydrogel.

The organosilicon compound may be provided to the present method as a single compound as described by formula (1) or (2) or as a mixture of two or more organosilicon compounds described by formulas (1) and (2).

Examples of useful organosilicon compounds include diethyldichlorosilane, allylmethyldichlorosilane, methylphenyldichlorosilane, phenylethyldiethoxysilane, 3,3,3-trifluoropropylmethyldichlorosilane, trimethylbutoxysilane, symdiphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, and bis{3-(triethoxysilyl) propyl}tetrasulfide. When the hydrophobic silica gel is to be used as a filler in silicone rubber, it is preferred that the organosilicon compound be hexamethyldisiloxane or dimethyldichlorosilane.

The amount of organosilicon compound added to the method is that sufficient to adequately hydrophobe the silica hydrogel to provide a hydrophobic silica gel suitable for its intended use. Generally the organosilicon compound should be added to the method in an amount such that there is at least 0.04 organosilyl unit per $SiO_2$ unit in the silica hydrogel. The upper limit of the amount of organosilicon compound added to the process is not critical since any amount in excess of the amount required to saturate the silica hydrogel will act as a solvent for the method.

During the conduct of step (B) it may be desirable to add a surfactant or water-miscible solvent to facilitate the reaction of the organosilicon compound with the silica hydrogel. Suitable surfactants can include, for example, anionic surfactants such as dodecylbenzene sulfonic acid, nonionic surfactants such as polyoxyethylene(23)lauryl ether and $(Me_3SiO)_2MeSi(CH_2)_3(OCH_2CH_2)_7OMe$ where Me is methyl, and cationic surfactants such as N-alkyltrimethyl ammonium chloride. Suitable water miscible solvents include, for example, alcohols such as ethanol, propanol, isopropanol, and tetrahydrofuran.

The hydrophobic silica hydrogel of step (B) may be used as is or may be recovered for use by such methods as centrifugation or filtration. The hydrophobic silica hydrogel may be dried by the use of such methods as heating or reducing pressure or a combination of both heating and reducing pressure.

A preferred method further comprises step (C) where the the hydrophobic silica hydrogel is contacted with an amount of water-immiscible organic solvent sufficient to convert the hydrophobic silica hydrogel to a hydrophobic silica organogel having a surface area within a range of about 100 $m^2/g$ to 850 $m^2/g$ as measured in the dry state. If desired, the organosilicon compound of step (B) and the organic solvent of step (C) can be added simultaneously to the silica hydrogel. Under these conditions the reaction of the silica hydrogel with the organosilicon compound and the replacement of the water in the hydrophobic silica hydrogel with the organic solvent may occur simultaneously. A preferred method is where the water-immiscible organic solvent is added after formation of the hydrophobic silica hydrogel thereby effecting formation of a hydrophobic organogel.

For purpose of this invention any organic solvent immiscible with water can be employed. Suitable solvents include low molecular weight siloxanes such as hexamethyldisiloxane, octamethylcyclotetrasiloxane, diphenyltetramethyldisiloxane and trimethylsilyl endblocked dimethylpolysiloxane fluids. When a siloxane is employed as a solvent it may serve both as a solvent and as a reactant with the silica hydrogel. In addition, suitable solvents include aromatic hydrocarbons such as toluene and xylene; heptane and other aliphatic hydrocarbon solvents; cycloalkanes such as cyclohexane; ethers such as diethylether and dibutylether; halohydrocarbon solvents such as methylene chloride, chloroform, ethylene chloride, and chlorobenzene; and ketones such as methylisobutylketone.

The amount of water-immiscible organic solvent is not critical so long as there is sufficient solvent to convert the hydrophobic silica hydrogel into a hydrophobic silica organogel. Preferably the solvent should have a boiling point below about 250° C. to facilitate its removal from the hydrophobic silica organogel, however the boiling point is not critical since the solvent may be removed from the hydrophobic silica organogel by centrifuging, evaporation, or other suitable means.

In step (A) or (B) of the present method an effective amount of a heat stabilizing agent selected from a group consisting of water soluble compounds of cerium and iron may be added. By the term "effective amount" it is meant that the water soluble compound of cerium or iron is present in the hydrophobic silica gel product of the present method at a concentration sufficient to provide improved heat stability to those compositions in which the hydrophobic silica gel is incorporated. Such compositions can include, for example, silicone rubber, natural rubber, and synthetic organic rubber.

Generally, about 0.01 percent weight/volume (% Wt./Vol.) to 10 %Wt./Vol. of the water soluble compound of cerium or iron in relation to the volume of components in step (A) or (B) is considered useful in the present process. Preferred is where the water soluble compound of cerium or iron comprises about 0.1 Wt./Vol. to 1%Wt./Vol. on the same basis.

Examples of water soluble compounds which may be useful in the present method include $FeCl_3$, $FeBr_2$, $FeBr_3.6H_2O$, $FeCl_2.4H_2O$, $FeI_2.4H_2O$, $Fe(NO_3)_3.6H_2O$, $FePO_4.2H_2O$, $CeCl_3.9H_2O$, $CeBr_3.H_2O$, $CeI_3.9H_2O$, $Ce(NO_3)_3.6H_2O$, and $Ce(SO_4)_2.2H_2O$. A preferred water soluble compound of cerium and iron for use in the present method is selected from the group consisting of $FeCl_3$ and $CeCl_3.9H_2O$.

After the silica hydrogel has been converted to the hydrophobic silica organogel the resulting product may be employed per se. That is the hydrophobic silica organogel may be used directly as a reinforcing agent in silicone rubber or in any other uses for which this type of product can be used. Alternatively, the solvent may be removed from the hydrophobic silica organogel and the resulting dry hydrophobic silica gel used.

The following examples are provided to illustrate the present invention. These examples are not intended to limit the scope of the present claims.

Example 1. A silica gel prepared and aged at pH 4, hydrophobed with hexamethyldisiloxane, and having incorporated therein $FeCl_3$ as a heat stabilizing agent was prepared. A silica hydrosol was prepared by adding 400 ml of PQ N Clear Sodium Silicate (PQ Corporation, Valley Forge, Pa.), 136 ml of concentrated HCl (Fisher Certified, Fisher Scientific, Fair Lawn, N.J.), and 1464 ml of deionized water to a 5 L flask. The silica hydrosol was adjusted to pH 4 by use of a dilute solution of PQ N Clear Sodium Silicate (PQ Corporation) in deionized water. A silica hydrogel was formed after stirring 30 minutes. The silica hydrogel was aged by stirring an additional 3 hours at room temperature.

After aging, to the silica hydrogel, with stirring, was added 500 ml of concentrated HCl (Fisher Certified), 833 ml of isopropanol, 227 ml of hexamethyldisiloxane, and 5.4 g of $FeCl_3$. After stirring the flask content for 1 hour at room temperature, 1.5 L of toluene were added. The flask content was stirred for an additional 2 to 3 minutes, stirring stopped, and the aqueous phase drained from the flask. 250 ml of isopropanol and 50 ml of deionized water were added to the flask and the content of the flask rapidly stirred for 2 minutes. Then, 700 ml of deionized water were added to the flask and after stirring an additional 2 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic silica gel. The hydrophobic silica gel was dried for 14 hours at 150° C. The yield of dried hydrophobic silica gel was 233 g. The BET surface area of the dried hydrophobic silica gel was determined by the method described supra; void volume, pore volume, average pore diameter, and particle size were characterized by standard methods; and carbon content was determined by CHN analysis using a Perkin Elmer Model 2400 CHN Elemental Analyzer (Perkin Elmer Corporation, Norwalk, Conn.). The result of these analysis are reported in Table 1.

Example 2. A silica gel prepared and aged at pH 4, hydrophobed with hexamethyldisiloxane, and having incorporated therein $FeCl_3$ as a heat stabilizing agent was prepared. A silica hydrosol was prepared by adding 400 ml of PQ N Clear Sodium Silicate (PQ Corporation), 136 ml of concentrated HCl (Fisher Certified), and 824 ml of deionized water to a 5 L flask. The silica hydrosol was adjusted to pH 4 by use of a dilute solution of PQ N Clear Sodium Silicate (PQ Corporation) in deionized water. A silica hydrogel was formed after stirring 23 minutes. The silica hydrogel was aged by heating at 100° C., with stirring, for an additional 50 minutes.

After aging, to the silica hydrogel, with stirring, was added 500 ml of concentrated HCl (Fisher Certified), 833 ml of isopropanol, 227 ml of hexamethyldisiloxane, and 5.4 g of $FeCl_3$. After stirring the flask content for 1 hour at room temperature, 1.5 L of toluene were added. After stirring the flask content for an additional 2 to 3 minutes, stirring was stopped and the aqueous phase drained from the flask. 250 ml of isopropanol and 50 ml of deionized water were added to the flask and the content of the flask rapidly stirred for 2 minutes. Then, 700 ml of deionized water were added and after stirring an additional 2 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic silica gel. The hydrophobic silica gel was dried for 14 hours at 150° C. The yield of dried hydrophobic silica gel was 204 g.

The hydrophobic silica gel was characterized by the methods described in Example 1 and the results are provided in Table 1.

Example 3. A silica gel prepared and aged at pH 4, hydrophobed with hexamethyldisiloxane, and having incorporated therein $FeCl_3$ as a heat stabilizing agent was prepared. A silica hydrosol was prepared by adding 400 ml of PQ N Clear Sodium Silicate (PQ Corporation), 136 ml of concentrated HCl (Fisher Certified), and 1464 ml of deionized water to a 5 L flask. The silica hydrosol was adjusted to pH 4 by use of a dilute solution of PQ N Clear Sodium Silicate (PQ Corporation) in deionized water. A silica hydrogel was formed after stirring 23 minutes. The silica hydrogel was aged by refluxing for 1.9 hours.

After aging, to the silica hydrogel, with stirring, was added 500 ml of concentrated HCl (Fisher Certified), 833 ml of isopropanol, 227 ml of hexamethyldisiloxane, and 5.4 g of $FeCl_3$. After stirring the flask content 1 hour at room temperature, 1.5 L of toluene were added. After stirring for an additional 2 to 3 minutes, stirring was stopped and the aqueous phase drained from the flask. 250 ml of isopropanol and 50 ml of deionized water were added to the flask and the content of the flask rapidly stirred for 2 minutes. Then, 700 ml of deionized water were added to the flask and after stirring an additional 2 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic silica gel. The hydrophobic silica gel was dried for 14 hours at 150° C. The yield of dried hydrophobic silica gel was 197 g.

The hydrophobic silica gel was characterized by the methods described in Example 1 and the results are provided in Table 1.

Example 4. A silica gel prepared and aged at pH 5.1 and hydrophobed with dimethyldichlorosilane was prepared. A silica hydrosol was prepared by adding 350 ml of PQ N Clear Sodium Silicate (PQ Corporation), 119 ml of concentrated HCl (Fisher Certified), and 1281 ml of deionized water to a 5 L flask. The silica hydrosol was adjusted to pH 5.1 by use of a dilute solution of PQ N Clear Sodium Silicate (PQ Corporation) in deionized water at which time a silica hydrogel began to form. The silica hydrogel was aged by refluxing for 3 hours.

After aging, to the silica hydrogel, with stirring, was added 625 ml of isopropanol and 72 ml of dimethyldichlorosilane. After stirring the flask content 1 hour at 65° C., the content was cooled and 1 L of toluene added. After stirring the flask content for an additional 2 to 5 minutes, stirring was stopped and the aqueous phase drained from the flask. 250 ml of isopropanol and 62 ml of deionized water were added to the flask and the content of the flask rapidly stirred for 2 minutes. Then, 688 ml of deionized water were added to the flask and after stirring the content an additional 5 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic silica gel. The hydrophobic silica gel was dried for 14 hours at 150° C. The yield of dried hydrophobic silica gel was 180 g.

The hydrophobic silica gel was characterized by methods described in Example 1 and the results are provided in Table 1.

Example 5. A silica gel prepared and aged at pH 5.1 and hydrophobed with dimethyldichlorosilane and vinylmethyldichlorosilane was prepared. A silica hydrosol was prepared by adding 350 ml of PQ N Clear Sodium Silicate (PQ Corporation), 119 ml of concentrated HCl (Fisher Certified), and 1281 ml of deionized water to a 5 L flask. The silica hydrosol was adjusted to pH 5.1 by use of a dilute solution of PQ N Clear Sodium Silicate (PQ Corporation) in deionized water at which time a silica hydrogel began to form. The silica hydrogel was aged by refluxing for 4 hours.

After aging, to the silica hydrogel, with stirring, was added 625 ml of isopropanol, 72 ml of dimethyldichlorosilane, and 4 ml of vinylmethyldichlorosilane. After stirring the flask content 1 hour at 65° C., the flask content was cooled and 1 L of toluene was added. After stirring the flask content for an additional 2 to 5 minutes, stirring was stopped and the aqueous phase drained from the flask. 500 ml of toluene, 250 ml of isopropanol, and 62 ml of deionized water were added to the flask and the content of the flask stirred for 2 minutes. Then, 690 ml of deionized water were added to the flask and after stirring the flask content an additional 5 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic silica gel. The hydrophobic silica gel was dried for 14 hours at 75° C. The yield of dried hydrophobic silica gel was 187 g.

The hydrophobic silica gel was characterized by methods described in Example 1 and the results are provided in Table 1.

Example 6. A silica gel prepared and aged at pH 5.1 and hydrophobed with dimethyldichlorosilane and bis{3-(triethoxysilyl) propyl}tetrasulfide was prepared. A silica hydrosol was prepared by adding 350 ml of PQ N Clear Sodium Silicate (PQ Corporation), 119 ml of concentrated HCl (Fisher Certified), and 1281 ml of deionized water to a 5 L flask. The silica hydrosol was adjusted to pH 5.1 by use of a dilute solution of PQ N Clear Sodium Silicate (PQ Corporation) in deionized water at which time a silica hydrogel began to form. The silica hydrogel was aged by refluxing for 4 hours.

After aging, to the silica hydrogel, with stirring, was added 625 ml of isopropanol and 15 ml of bis{3-(triethoxysilyl) propyl}tetrasulfide. After stirring the flask content 5 minutes, 72 ml of dimethyldichlorosilane were added to the flask. After stirring the flask content 1 hour at 65° C., the content was cooled and 1 L of toluene was added. After stirring for an additional 2 to 5 minutes, stirring was stopped and the aqueous phase drained from the flask. 500 ml of toluene, 250 ml of isopropanol, and 62 ml of deionized water were added to the flask and the content of the flask stirred for 2 minutes. Then, 690 ml of deionized water were added and after stirring the flask content an additional 5 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic silica gel. The hydrophobic silica gel was dried for 14 hours at 75° C. The yield of dried hydrophobic silica gel was 199 g.

The hydrophobic silica gel was characterized by methods described in Example 1 and the results are provided in Table 2.

Example 7. A silica gel prepared at pH 5, aged at pH 6, hydrophobed with dimethyldichlorosilane, and having incorporated therein $FeCl_3$ as a heat stabilizing agent was prepared. A silica hydrosol was prepared by adding 500 ml of PQ N Clear Sodium Silicate (PQ Corporation), 128 ml of concentrated HCl (Fisher Certified), and 1820 ml of deionized water to a 5 L flask. The silica hydrosol was adjusted to pH 5 by use of a dilute solution of PQ N Clear Sodium Silicate (PQ Corporation) in deionized water. A silica hydrogel formed after stirring the silica hydrosol at pH 5 for a few minutes. The silica hydrogel was heated to 85° C. and additional sodium silicate added to increase the pH to 6. This mixture was aged by refluxing at pH 6 for 2 hours.

After aging, to the silica hydrogel, with stirring, was added 833 ml of isopropanol, 128 ml of dimethyldichlorosilane, and 5.4 g of $FeCl_3$. After stirring the flask content 5 minutes at room temperature, 2 L of toluene were added. After stirring the flask content an additional 2 to 5 minutes, stirring was stopped and the aqueous phase drained from the flask. Then, 1 L of deionized water was added to the flask and after stirring the flask content an additional 5 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic silica gel. The hydrophobic silica gel was dried for 14 hours at 150° C. The yield of dried hydrophobic silica gel was 243 g.

Example 8. A silica gel prepared at pH 5.1, aged at pH 6, hydrophobed with dimethyldichlorosilane, and having incorporated therein $FeCl_3$ as a heat stabilizing agent was prepared. A silica hydrosol was prepared by adding 500 ml of PQ N Clear Sodium Silicate (PQ Corporation), 170 ml of concentrated HCl (Fisher Certified), and 1830 ml of deionized water to a 5 L flask. The silica hydrosol was adjusted to pH 5.1 by use of a dilute solution of PQ N Clear Sodium Silicate (PQ Corporation) in deionized water. A silica hydrogel formed upon stirring for a few minutes. The silica hydrogel was aged by heating to 60° C., adjusting the pH to 6 with a dilute aqueous solution of sodium silica, and then refluxing for 2 hours.

After aging, the silica hydrogel was cooled to room temperature and sheared for two minutes in a Waring Blender (Model 7011, Waring Products Division of Dynamics Corporation of America, New Hartford, Conn.) to reduce aggregate particle size and improved the uniformity of the particle size distribution. The sheared silica hydrogel was returned to the 5 L flask and, with stirring, was added 833 ml of isopropanol, 128 ml of dimethyldichlorosilane, and 5.4 g of $FeCl_3$. After stirring the flask content 15 minutes at room temperature, 2 L of toluene were added. After stirring for an additional 2 to 5 minutes, stirring was stopped and the aqueous phase drained from the flask. Then, 1 L of deionized water was added and after stirring an additional 5 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic silica gel. The hydrophobic silica gel was dried for 14 hours at 75° C. The yield of dried hydrophobic silica gel was 242 g.

The BET surface area of the dried hydrophobic silica gel was determined by the method described in Example 1 and the result is provided in Table 2.

Example 9. A silica gel prepared at pH 5.1, aged at pH 6, hydrophobed with dimethyldichlorosilane, and having incorporated therein $FeCl_3$ as a heat stabilizing agent was prepared. A silica hydrosol was prepared by adding 500 ml of PQ N Clear Sodium Silicate (PQ Corporation), 170 ml of concentrated HCl (Fisher Certified), and 1830 ml of deionized water to a 5 L flask. The silica hydrosol was adjusted to pH 5.1 by use of a dilute solution of PQ N Clear Sodium Silicate (PQ Corporation) in deionized water. A silica hydrogel formed upon stirring for a few minutes. The silica hydrogel was aged by heating to 60° C., adjusting the pH to 6 with a dilute aqueous solution of sodium silica, and then refluxing for 2 hours.

After aging, the silica hydrogel was cooled to room temperature and 10 ml of concentrated HCl (Fisher Certified) and 5.4 g of $FeCl_3$ added. This mixture was sheared for two minutes in a Waring Blender (Model 7011) to reduce aggregate particle size and improve the uniformity of the particle size distribution. The sheared silica hydrogel was returned to the 5 L flask and, with stirring, was added 833 ml of isopropanol and 128 ml of dimethyldichlorosilane. After stirring the flask content for 15 minutes at room temperature, 2 L of toluene were added. After stirring the flask content for an additional 2 to 5 minutes, stirring was stopped and the aqueous phase drained from the flask. Then, 1 L of deionized water was added to the flask and after stirring the flask content an additional 5 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic silica gel. The hydrophobic silica gel was dried for 14 hours at 75° C. The yield of dried hydrophobic silica gel was 240 g.

Example 10. A silica gel prepared and aged at pH 5.7, hydrophobed with dimethyldichlorosilane, and having incorporated therein $FeCl_3$ as a heat stabilizing agent was prepared. A silica hydrosol was prepared by adding 500 ml of PQ N Clear Sodium Silicate (PQ Corporation), 170 ml of concentrated HCl (Fisher Certified), and 1830 ml of deionized water to a 5 L flask. The silica hydrosol was adjusted to pH 5.7 by use of a dilute solution of PQ N Clear Sodium Silicate (PQ Corporation) in deionized water. A silica hydrogel was formed after stirring a few minutes. The silica hydrogel was aged by refluxing for 2 hours.

After aging, the silica hydrogel was cooled to 45° C. and 133 ml of dimethyldichlorosilane and 5.4 g of $FeCl_3$ were added to the flask containing the silica hydrogel. The temperature of the flask content was increased to 65° C. and stirring continued for 15 minutes. 2 L of toluene were added to the flask. After stirring the flask content for an additional 2 to 5 minutes, stirring was stopped and the aqueous phase drained from the flask. 250 ml of isopropanol and 50 ml of deionized water were added to the flask and the content of the flask stirred for 2 minutes. Then, 700 ml of deionized water were added to the flask and after stirring the flask content an additional 5 minutes the aqueous phase was drained from the flask. The wash phase comprising the addition of 250 ml of isopropanol, 50 ml of deionized water, and 700 ml of deionized water was repeated.

The flask was fitted with a Dean-Stark trap and the toluene phase refluxed to remove residual water. The toluene phase was poured into glass pans and the toluene evaporated leaving as product a hydrophobic silica gel. The hydrophobic silica gel was dried for 14 hours at 150° C. The yield of dried hydrophobic silica gel was 253 g.

Example 11. Each of the dried hydrophobic silica gels prepared in Examples 7, 8, and 9 was compounded into a silicone rubber composition, the composition cured, and the physical properties of the cured silicone rubber determined. Each of the dried hydrophobic silica gels was compounded at 38 parts per hundred (pph) by weight into a polydimethylsiloxane gum containing about 0.15 mole percent vinyl radicals substituted on silicon atoms and having a plasticity of about 55 to 65. Into these base compositions was blended 0.77 pph by weight of 2,5-bis (tert-butylperoxy)-2,5-dimethylhexane, based on the weight of the polydimethylsiloxane. The catalyzed base compositions were cured in appropriate configurations for physical property testing by hot pressing at 34.5 MPa for 15 minutes at 175° C. The following test methods were used to test the cured silicone rubber: Tensile, ASTM D412; Elongation, ASTM D412; Modulus @50%, ASTM D412;; Modulus @100%, ASTM D412; Tear (Die B), ASTM D624; and Tear (Die C), ASTM 624. Plasticities of the uncured compositions were measured on samples weighing two times the specific gravity of the composition that were formed into balls and rested one hour before measurement by ASTM 926. The results of this testing are provided in Table 2.

TABLE 1

Physical Properties of Hydrophobic Silica Gels

| Property | Example Number | | | | |
|---|---|---|---|---|---|
| | 1 | 2 | 3 | 4 | 5 |
| BET Surface Area (m²/g) | 839 | 699 | 618 | 236 | 253 |
| Void Volume (cm³/g) | 4.22 | 5.19 | 5.00 | 3.57 | 3.06 |
| Pore Volume (cm³/g) | 2.29 | 2.79 | 2.99 | *— | — |
| Ave. Pore Dia. (Å) | 75.2 | 106.2 | 127.0 | — | — |
| Particle Size (μm) | 71.3 | 50.9 | 85.0 | — | — |
| Carbon Content (Wt. %) | 12.76 | 9.47 | 8.45 | — | — |

*—Indicates data not available.

TABLE 2

Physical Properties of Hydrophobic Silica Gels and Silicone Rubber Reinforced Therewith

| Property | Example Number | | | |
|---|---|---|---|---|
| | 6 | 7 | 8 | 9 |
| BET Surface Area (m²/g) | 234 | *— | 257 | — |
| Void Volume (cm³/g) | 2.84 | — | — | — |
| Pore Volume (cm³/g) | — | — | — | — |
| Ave. Pore Dia. (Å) | — | — | — | — |
| Particle Size (μm) | — | — | — | — |
| Plasticity | — | 92 | 83 | 89 |
| Tensile (MPa) | — | 6.84 | 5.56 | 7.42 |
| Elongation (%) | — | 759 | 635 | 755 |
| Modulus @50% (MPa) | — | 0.61 | 0.65 | 0.66 |
| Modulus @100% (MPa) | — | 0.95 | 1.06 | 1.03 |
| Tear B (kN/m) | — | 12.60 | 11.03 | 11.97 |
| Tear C (kN/m) | — | 14.35 | 15.17 | 13.88 |

*—Indicates data not available.

We claim:

1. A method for preparing a hydrophobic silica gel comprising: (A) adjusting the pH of a silica hydrosol comprising about 0.02 to 0.5 g of SiO₂ per milliliter with a base to within a range of about pH 3 to pH 7 at a temperature within a range of about 10° C. to 250° C. to facilitate formation of a silica hydrogel and (B) mixing the silica hydrogel with (1) a catalytic amount of a strong acid and (2) an organosilicon compound selected from the group consisting of organosilanes described by formula

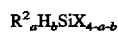

and organosiloxanes described by formula

where each R² is independently selected from a group consisting of hydrocarbon radicals comprising about 1 to 12 carbon atoms and organofunctional hydrocarbon radicals comprising about 1 to 12 carbon atoms, each X is independently selected from a group consisting of halogen and alkoxy radicals comprising 1 to 12 carbon atoms, a=0, 1, 2, or 3, b=0 or 1, a+b=1, 2, or 3 with the proviso that when b=1 then a+b=2 or 3, n is an integer of from 2 to 3 inclusive to form a hydrophobic silica hydrogel having a surface area within a range of about 100 m²/g to 850 m²/g as measured in the dry state.

2. A method according to claim 1, where the pH of the silica hydrosol is adjusted by means of a base to within a range of about pH 3.5 to pH 6.

3. A method according to claim 1, where the temperature of the silica hydrosol during conduct of step (A) is within a range of about 75° C. to 150° C.

4. A method according to claim 1, where the temperature of the silica hydrosol during conduct of step (A) is within a range of about 90° C. to 110° C.

5. A method according to claim 1 further comprising aging the silica hydrogel of step (A) at a pH within a range of about pH 3.5 to pH 8 and a temperature within a range of about 0° C. to 250° C. for a period of time within a range of about 10 minutes to 76 hours prior to conduct of step (B).

6. A method according to claim 1 further comprising aging the silica hydrogel of step (A) at a pH within a range of about pH 6 to pH 7.5 and a temperature within a range of about 20° C. to 150° C for a period of time within a range of about 1 to 24 hours prior to conduct of step (B).

7. A method according to claim 1, where the temperature is within a range of about 80° C. to 130° C.

8. A method according to claim 1 further comprising shearing the silica hydrogel of step (A) prior to conduct of step (B).

9. A method according to claim 1, where the mixing of step (B) is conducted at a temperature within a range of about 30° C. to 150° C.

10. A method according to claim 1, where the organosilicon compound is an organosiloxane.

11. A method according to claim 10, where organosiloxane is hexamethyldisiloxane.

12. A method according to claim 1, where the organosilicon compound is an organosilane.

13. A method according to claim 12, where the organosilane is selected from the group consisting of vinylmethyldichlorosilane, vinyldimethylchlorosilane, hexenylmethyldichlorosilane, hexenyldimethylchlorosilane, dimethyldichlorosilane, and bis{3-(triethoxysilyl)propyl}tetrasulfide.

14. A method according to claim 1, where the organosilicon compound provides at least 0.04 organosilyl units per SiO₂ unit of the silica hydrogel.

15. A method according to claim 1 further comprising during the mixing of step (B) the presence of a surfactant which facilitates reaction of the organosilicon compound with the silica hydrogel.

16. A method according to claim 1 further comprising during the mixing of step (B) the presence of a water-miscible solvent which facilitates reaction of the organosilicon compound with the silica hydrogel.

17. A method according to claim 1 further comprising mixing the silica hydrogel with an effective amount of a heat stabilizing agent selected from the group consisting of water soluble compounds of cerium and iron.

18. A method according to claim 17, where the water soluble compound is selected from the group consisting of $FeCl_3$ and $CeCl_3 \cdot 9H_2O$.

19. A method according to claim 1 further comprising (C) contacting the hydrophobic silica hydrogel with a sufficient quantity of a water-immiscible organic solvent to convert the hydrophobic silica hydrogel into a hydrophobic silica organogel having a surface area within a range of about 100 m²/g to 850 m²/g as measured in the dry state.

20. A hydrophobic silica gel prepared by the method of claim 1.

21. A hydrophobic silica gel prepared by the method of claim 5.

22. A hydrophobic silica gel prepared by the method of claim 8.

23. A hydrophobic silica gel prepared by the method of claim 17.

* * * * *